6115X
J. Crane.
Turn-Table.
Patented Oct. 1, 1830.
NO PRINTED COPY OF SPECIFICATION IN OFFICE.
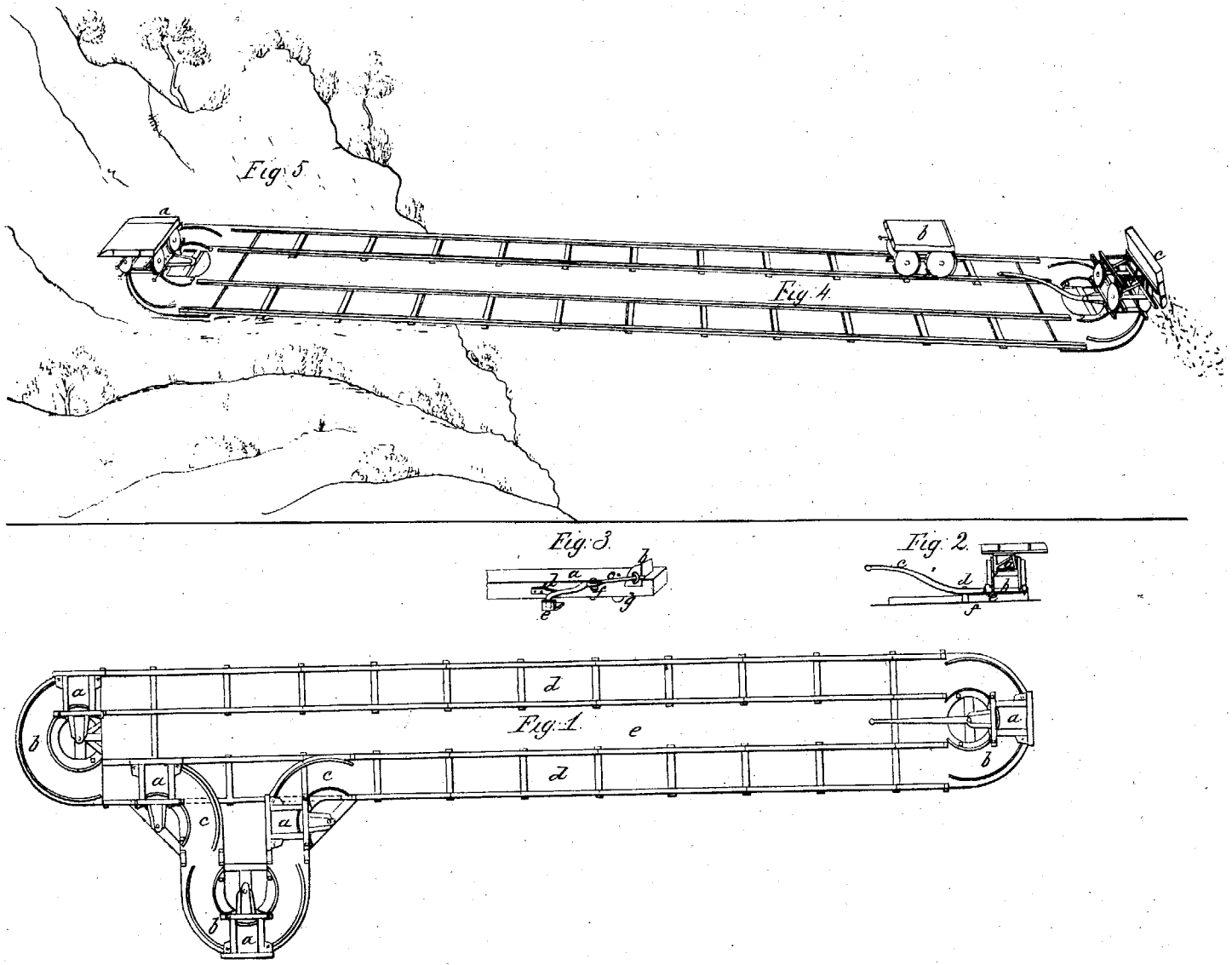

Jonathan Crane 6115X
Letters Patent

The schedule referred to in these Letters Patent and making part of the same containing a description in the words of the said Jonathan Crane himself of his improvement in the circular Car Receiver

---

The utility of the circular Car Receiver consists mainly in the facility, which it affords in removing the car or other vehicle from one rail to the other. It is believed that important advantages will be derived from its use in removing ponderous bodies of earth from hills into vallies & that it can be applied with great advantage in graduating for rail roads and at the termination of rail ways in removing the car or other vehicle when loaded or empty from one rail to the other whether the rail ways are parallel or at right angles. In removing banks of earth with teams in the ordinary way great inconvenience arises especially where the cutting is deep & the embankment of considerable height & more especially in grading for rail ways where the cutting is narrow & the top of the embankment so narrow that an ordinary team cannot be turned on the embankment or in the hill without difficulty & hazard. In using the ordinary rail way for the aforesaid purpose difficulties are encountered especially in removing the earth to the spot where it is wanted for embankment. In the last case a number of cars in succession are to unload at the same time. As only one on the same rail way can be made to deposit its contents where it is needed viz. at the brink or edge of the embankment & as it cannot return until the others are unladen considerable expense must necessarily attend the removing of the earth from the place where it is unloaded to the end of the embankment where it is required finally to be deposited. This difficulty must occur when more than one car is used on the same rail unless it can be overcome by removing the loaded car from one rail to the other at the extremity of the embankment. & this it is believ-ed the circular car receiver will fully accomplish. By means of it the the aforesaid difficulty is removed in as much as the car can be enter-
ed while in the act of removing on a platform (on the brink of the em-
bankment) from one rail to the other. The petitioner would state expressly
by that altho on the drawing accompanying this specification there is a
representation of a road & rail way yet he does not pretend to have made
any discovery either in the formation of the car or in the ordinary rail way
but his invention or improvement is confined to the removing of the car on
a horizontal circular platform from one rail to the other. whether the
rails are parallel or at right angles by means of the following process.
When a car or other vehicle is to be removed from one line of the rail way to
the other the platform is placed at the termination of the rail way a lit-
tle lower than the terminating line of the rail way) & on this platform is
placed a carriage with two rails that are on a level with the rails of
the main line, This Carriage is placed upon rollers which while
receiving the car is secured by means of a spring catch. When the car
is placed on this platform the Catch is loosed & the carriage contain-
ing the car is removed with great ease by means of a lever moving on a
fulcrum placed in the centre of the circular sweep of the platform.
or the car may be removed without the use of the lever It is to be observ-
ed that there are necessarily two platforms one at each extremity of the
rail way on the one of course the car is placed to receive its load & on
the opposite one the car while in the act of turning discharges its con-
tents. It is conceived that not only will the process of the circular
car receiver operate at the termination of rail ways but with equal
advantage also at the conjunction of two rail ways running at right
angles or at any other angle. In the latter case the fulcrum of the lev-
er by means of which the car is to be removed may be so placed that
the car can be removed from the one rail way to the other rail way at
what ever point may be required Witnesses Jonathan [illegible]

End. Gideon Conant
1796 Giles F. Yates

Patented 1 October 1830

[illegible]